United States Patent [19]

Engelhard et al.

[11] 4,071,437

[45] Jan. 31, 1978

[54] CATALYSTS FOR THE HYDROTREATMENT OF HYDROCARBONS AND A PROCESS FOR THE PREPARATION AND UTILIZATION THEREOF

[75] Inventors: Philippe Engelhard; Joseph Edouard Weisang; Guy Paris, all of Le Havre, France

[73] Assignee: Compagnie Francaise de Raffinage, Paris, France

[21] Appl. No.: 566,095

[22] Filed: Apr. 8, 1975

[30] Foreign Application Priority Data

Apr. 8, 1974    France ................................ 74 12329

[51] Int. Cl.$^2$ .................... C10G 35/06; B01J 21/04; B01J 23/74
[52] U.S. Cl. .................... 208/137; 252/439; 252/466 J
[58] Field of Search .................... 208/137, 138, 139; 252/466 J, 439

[56] References Cited

U.S. PATENT DOCUMENTS

| 3,480,531 | 11/1969 | Mulaskey ............................. 252/466 J |
|---|---|---|
| 3,506,709 | 4/1970 | Nakamura et al. ................. 252/466 J |
| 3,519,575 | 7/1970 | Bozik et al. ......................... 252/466 J |
| 3,617,527 | 11/1971 | Hilfman ............................... 252/466 J |
| 3,691,102 | 9/1972 | Swift .................................. 252/466 J |
| 3,770,616 | 11/1973 | Kominami et al. ................... 208/138 |
| 3,775,300 | 11/1973 | Hayes ................................. 208/138 |
| 3,796,654 | 3/1974 | Wilhelm .............................. 208/138 |
| 3,821,123 | 6/1974 | Germanas et al. ................... 252/439 |
| 3,825,503 | 7/1974 | Patrick et al. ..................... 252/466 J |
| 3,884,836 | 5/1975 | Kuhl et al. ........................ 252/466 J |
| 3,898,179 | 8/1975 | Germanas et al. ................... 252/439 |
| 3,933,683 | 1/1976 | Hilfman .............................. 252/439 |
| 3,965,041 | 6/1976 | Van Klinken et al. .............. 252/439 |

*Primary Examiner*—Delbert E. Gantz
*Assistant Examiner*—James W. Hellwege
*Attorney, Agent, or Firm*—Curtis, Morris & Safford

[57] ABSTRACT

Catalysts are disclosed for the hydrotreatment of hydrocarbons, and particularly for reforming, which contain no platinum and which consist of:

A refractory-mineral carrier (alumina).

0.05 to 5 wt. % of at least one first metal from the group consisting of iron, cobalt, and nickel.

At least one second metal from the group consisting of tin (0.01 to 5%), lead (0.01 to 10%), and germanium (0.01 to 4%).

Possibly from 0.01 to 0.5% of sulfur.

Processes for preparation of these catalysts, by impregnation, and for their use are disclosed. It is preferable to deposit the metal (or the metals) from the tin-germanium-lead group before the metal or metals from the iron-cobalt-nickel group are deposited.

47 Claims, No Drawings

CATALYSTS FOR THE HYDROTREATMENT OF HYDROCARBONS AND A PROCESS FOR THE PREPARATION AND UTILIZATION THEREOF

The present invention relates to new hydrotreating catalysts, particularly for the reforming of hydrocarbons and, more particularly, of petroleum fractions whose distilling range corresponds to that of gasoline and naphtha. It also relates to processes for the preparation of such catalysts as well as their utilization in the reforming of hydrocarbons.

Catalytic hydrotreating processes are processes applied to hydrocarbon charges in the presence of hydrogen which entail hydrogenation/dehydrogenation, isomerization, cyclization and dehydrocyclization reactions. These reactions may occur simultaneously, as in the case of the hydroreforming of naphtha. However, depending on the nature of the hydrocarbon charge, the reaction conditions and the nature of the catalyst, one of these reactions may preponderate — dehydrocyclization or hydroisomerization, for example.

It is a well-known fact that there is at present a great upsurge in catalytic hydrotreating processes for hydrocarbons. It is linked, on the one hand, to the need of the refineries for a source of gasoline of very high octane rating which is used either as is or, more generally, after being blended with a petroleum fraction having a nearby boiling range but a lower octane rating, and, on the other hand, the need of the petrochemical complexes for a source of aromatic hydrocarbons, as these are the important raw materials of the plastics industry.

The metals of group VIII of the periodic table of elements, and particularly platinum, deposited on an acidic or slightly acidic refractory-mineral carrier, have up to now been employed in all hydrotreating catalysts used on an industrial scale. They are employed either alone or in association with other metals. It is known that for the purpose of increasing the octane rating of the effluent obtained, as well as the liquid yield of the hydrotreating reaction (and particularly the yield in aromatic hydrocarbons, without having to raise the platinum content), bimetallic and trimetallic catalysts have come into use. Among which catalysts one might cite, for example:

Pt-Sn, Pt-Pb, Pt-Ge, Pt-Re, Pt-Ir, Pt-Au, Pt-Cu, Pt-Sn-Re, Pt-Sn-Ir, Pt-Ir-Mn, Pt-Sn-Ge, Pt-Pb-Re, Pt-Ge-Re, and Pt-Ir-Re.

It will be noted that platinum is present in all of these catalysts. Occasionally it is replaced by another platinum-group metal, that is to say, a metal from the group comprising, in addition to platinum, ruthenium, rhodium, palladium, osmium and iridium.

These catalysts are very advantageous and give excellent results in the reforming of hydrocarbons. They do, however, have a major drawback, namely, their cost. In fact, while the content of the catalysts in metals such as platinum is very low, generally ranging from 0.10 to 0.70% of the total weight of the catalyst, the tonnages of catalyst required in a reforming unit are such that the weight of platinum tied up is considerable. This represents a substantial investment for the user.

Efforts have been made to find hydrotreating catalysts other than platinum. One might mention, for example, catalysts based on tin and rhenium, as described in U.S. Pat. Nos. 3,598,723, 3,557,022 and 3,694,347. Belgian patent 776,045 describes a catalyst for the conversion of hydrocarbons which consists of an alumina carrier on which an active metal and a compound of magnesium, aluminum, titanium and/or zirconium are deposited. The active metal may be silver, copper, vanadium, molybdenum, tungsten, rhenium, cobalt, nickel, platinum, rhodium or palladium. It may be associated with lead, germanium, bismuth or tin. The carrier preferably contains less than 30% of alumina but may consist entirely of alumina calcined at between 800° and 1800° C and having a specific surface of less than 50 $m^2/g$.

Other catalysts containing different metals have also been developed. Among these are, for example, zirconium, bismuth, niobium, a bimetallic association of these metals or of zirconium and silver, copper, molybdenum, antimony or yttrium, deposited on a zeolite or mordenite carrier, as described in German Pat. No. 2,127,170. United States Pat. No. 3,639,648 describes a catalyst for the reforming of hydrocarbons which consists of nickel oxide, uranium oxide, $U_3O_8$, and an alkali-metal uranate, deposited on alumina or a spinel.

Certain other catalysts which likewise contain to platinum are useful only in the isomerization or disproportionation of hydrocarbons — in other words, in just one of the complex reactions which take place particularly in the reforming of hydrocarbons.

Thus, most of the catalysts consisting mainly of nickel, alone or in association with other metals deposited on a carrier, serve for the hydrocracking or desulfurization or hydrogenation or isomerization of hydrocarbon charge stocks.

For example, United States Pat. 3,542,696 describes catalysts containing nickel or compounds of nickel in association with a coprecipitated compound of tin, deposited on silica. The metals are in the oxide or sulfide state, and these catalysts are employed in the hydrocracking of hydrocarbons.

An object of the present invention is to provide catalysts for the hydrotreatment of hydrocarbons which will secure for the effluent a good octane rating and which do not contain any platinum-group metal and, more particularly, which do not contain platinum itself.

Thus, preferred embodiments of the present inventions are catalysts for the hydrotreatment of hydrocarbons which comprise a non-cracking refractory-mineral carrier, the following metals, either in the free state or combined:

a. From 0.5 to 5.%, and preferably from 0.1 to 1.5%, based on the total catalyst weight of at least one first metal from the group consisting of iron, cobalt and nickel.

b. At least one second metal from the group consisting of tin, germanium and lead whose weight percentages, based on the total weight of the catalyst, are comprised between 0.02 and 5%, 0.01 and 4%, and 0.01 and 10%, respectively.

c. Possibly from 0.01 to 0.5%, based on the total catalyst weight, of sulfur.

In the remainder of this specification and in the claims, "first metal" will be understood to mean a metal from the group consisting of iron, cobalt and nickel, and "second metal", a metal from the group consisting of tin, germanium and lead.

In the preferred catalysts as defined above said non-cracking carrier advantageously has a specific surface area greater than 15 $m^2/g$ and a pore volume greater than 0.1 cc/g.

Still another preferred embodiment of the present invention is a process for preparation of the catalysts defined above, said process being of the type involving at least one impregnation of the noncracking refractory carrier with at least one solution containing at least one of the elements to be deposited, said process being characterized by the fact that at least one of the impregnating solutions contains either cations formed from at least one first metal and/or at least one second metal, or anions formed from at least one first metal and/or at least one second metal.

A further preferred embodiment of the present invention is a process for the hydroreforming of hydrocarbons which consists in contacting, under conditions which are known in hydroreforming reactions, a charge of hydrocarbons with hydrogen and a catalyst as defined above.

The applicants have found that the catalysts defined above are good hydroreforming catalysts.

In order that sufficiently active and selective catalysts may be obtained, it is necessary that they contain at least 0.05%, based on the total catalyst weight, of at least one first metal. The applicants have found that it is advantageous that this percentage be greater than 0.1%. Above 5%, on the other hand, the results obtained are not such as to warrant such contents. This is true to a lesser extent also of contents between 1.5 and 5%. Thus the preferred weight percentages for said first metals are between 0.5 and 1.5% of the total catalyst weight. The same applies to the second metals, except that for said second metals (tin, lead, and germanium) the limits on the amount of metal to be deposited vary according to the metal. Thus, particularly useful catalysts are those which contain from 0.02 to 5% of tin and/or from 0.01 to 4% of germanium and/or from 0.01 to 10% of lead.

The carriers of the catalysts in accordance with the invention are refractory substances which do not give rise to the cracking reaction and which are customarily used with hydrotreating catalysts. These carriers, which are well known to persons skilled in the art, have sufficient specific surface area and pore volume; the specific surface area being greater than 15 m$^2$/g, and being preferably comprised between 100 and 350 m$^2$/g; and the pore volume being greater than 0.1 cc/g. These substances should, moreover, have an acidic or slightly acidic character (due to the presence of acid sites), either in the sense of Bronsted or in the sense of Lewis. The measure of the acidity of the carrier characterizes the presence and magnitude of these sites. (Hugues, White and White, Journal of Catalysis, 1969, vol. 13, pages 58–64; Tanaka and Ogasawara, Journal of Catalysis, 1970, vol. 16, pages 157–163.) Alumina and the aluminosilicates, for example, are well suited. The acidity of these carriers may be altered, if desired, prior to deposition of at least one metal from the group consisting of iron, cobalt and nickel, by treating said carrier with an acid solution. While conducting its tests, for example, the applicants effected a treatment with an 0.15 N solution of oxalic acid. As a general rule, these carriers are calcined at a temperature comprised between 500° and 700° C before any other treatment.

The catalysts may be prepared by the techniques for impregnation of a carrier with solutions containing the elements to be deposited. The various metals may be deposited in any desired order. When a bimetallic catalyst containing tin and/or germanium and nickel is prepared, it will be preferably to deposit the tin and/or the germanium before the nickel is deposited. As a general rule, it will be preferable to deposit the one or more metals from the group consisting of lead, tin and germanium before the one or more metals from the group consisting of iron, cobalt and nickel are deposited.

The impregnating solutions used to deposit the first and/or second metals may contain said metals in different forms. Thus they may be present as cations at a degree of oxidation which is stable under the operating conditions and in the working medium, for example, $Sn^{2+}$, $Sn^{4+}$, $Fe^{3+}$, $Ni^{2+}$, and $Pb^{2+}$. Most often there will be salts such as the chlorides, nitrates and acetates of said metals in the impregnating solution, and these will release the desired metallic cations in solution. But the metals may also enter into the formation of more or less complex anions. Thus, the nickel, for example, may be in the form of an anionic complex of a hydroxy acid or of a polyacid (nickelocitric, nickelolactic or nickelotartaric acid). The salts of these acids may also be used. For example, in the course of some of its tests, the applicants have worked with nickelous oxalates of ammonium with the general formula $Ni(C_2O_4)_n$ $(NH_4)_{2n-2}$–where $n$ is equal to 2 and/or 3. In an impregnating solution, such a salt is preferably used in the presence of an excess of diammonium oxalate, which acts as stabilizer for the solution. Solutions of cobaltous ammonium oxalate or ferric ammonium oxalate may also be used. The impregnating operations may be preformed at ordinary temperature or at a somewhat more elevated temperature. Temperatures comprised between 10 and 80° C will be perfectly satisfactory. In order to deposit these metals on the carrier, which generally will be in the form of small particles, the latter may be subjected to a socalled static impregnation, with the granules immersed in the impregnating solution, or a so-called dynamic impregnation, with the impregnating solution circulating over a fixed bed of carrier granules. The solutions may be renewed in the course of these operations.

After every deposition of a metal (first and/or second metal), the solid obtained may be dried at a temperature comprised approximately between 100° and 130° C. Such drying will be followed by a calcination at a temperture ranging from 400° to 700° C, and preferably comprised between 500° and 600° C, when only one or more metals from the group consisting of tin, lead and germanium have been deposited. When one or more metals from the group consisting of iron, cobalt and nickel have been deposited, the calcining temperature should not exceed 500° C.

When all of the metals selected have been deposited on the carrier, and after the calcining steps, the metal oxides which formed during the calcinations must be reduced. Hydrogen may be employed for this purpose, the hydrogenation treatment being carried out at a temperature comprised between 500° and 600° C. However, the applicants have found that a different treatment will be more advantageous. Instead of effecting a reduction of the catalyst with hydrogen, it is preferable to perform on the dried and calcined catalyst or on the dried out uncalcined catalyst, at a temperature comprised between 350° and 400° C, a sulfurization by means of sulfurizing agents such as sulfurized hydrogen, organic sulfides, or low-molecular-weight mercaptans, diluted or not in an inert gas or in the hydrogen. For example, hydrogen containing from 1 to 20%, and preferably from 5 to 10%, of hydrogen sulfide may be used.

Following this sulfurization, a partial desulfurization with hydrogen is effected at a more elevated temperature, approximately 500 to 600° C. The partial desulfurization with hydrogen may, if desired, be followed or preceded by a treatment with a gaseous mixture of hydrogen and steam at a temperature on the order of 300° to 550° C. In said gaseous mixture, the steam partial pressure will be comprised between 10 and 40 mm Hg.

This preferential treatment involving a sulfurization followed by a partial desulfurization has the effect of increasing the dehydrocyclizing activity of the catalyst and will leave on the catalyst an amount of sulfur comprised between 0.01 and 0.5%, based on the total catalyst weight.

The catalysts so obtained may be used in the reactions for the hydrotreatment of hydrocarbons, and particularly in the hydroreforming of petroleum fractions whose boiling temperature is comprised between 35° and 250° and whose sulfur content is preferably less than 10 ppm. and is possible less than 1 ppm.

The invention is illustrated by the examples which follow and which are not limitative. They relate to the preparation of catalysts in accordance with the invention and to their utilization and in the hydroreforming of a charge consisting of normal heptane. The particular charge is not to be construed as a limitation of the field of application of said catalysts but is customarily used to test the possibilities of hydroreforming catalysts.

EXAMPLE 1

Several catalysts containing only nickel (controls T1 and T2) or containing nickel and tin (catalysts A and B) are prepared, all deposited an an alumina in the form of extrusions whose characteristics are as follows:

| Average diameter of extrusions | 1.5 mm |
|---|---|
| Specific surface area | 190 m²/g |
| Pore volume | 0.51 cc/g |
| Average pore radius | 0.55 A |

This alumina was calcined in air for 2 hours at 600° C before any other treatment.

PREPARATION OF CONTROLS T1 and T2

First the impregnating solution containing the nickel is prepared. Freshly prepared nickel oxalate ($NiC_2O_4$) is dissolved in a solution of ammonium oxalate in exactly the amount necessary for solubilization (1 mole of nickel oxalate and 3.5 moles of ammonium oxalate). By the addition of alcohol, a solid is precipitated which consists of a mixture of nickelous ammonium oxalate and diammonium oxalate in excess. The solid obtained is isolated and then dissolved in water. Thus the nickel impregnating solution is obtained. An excess of diammonium oxalate is added to it, this excess being approximately 50% by weight of the solid precipitated with alcohol.

The solution obtained, which has an initial nickel concentration of 1.5 grams/liter, serves for impregnation of the alumina described above at the rate of 1 g of alumina per 10 cc of solution, at ambient temperature (about 20° C), so as to give a proportion of nickel of about 0.40% in the solid ultimately obtained. Control T1 is impregnated by the static method, control T2 by the dynamic method.

After drying at 120° C, the solids obtained are subjected to the following treatments:

Treatment with a mixture of $H_2$ and $H_2S$ (ratio of ($H_2S/H_2$) = ¼) for 3 hr. at 370° C.

Treatment with a pure, dry hydrogen stream for 4 hr. at 500° C.

Treatment with a mixture of $H_2$ and $H_2O$ (ratio of ($H_2O/H_2$) = 3/100) for 4 hr. at 500° C.

Analysis of the catalysts shows nickel contents of 0.40 and 0.36% by weight, respectively, for T1 and T2, and sulfur contents of 0.06 and 0.05% by weight, respectively.

PREPARATION OF CATALYSTS A AND B

Extrusions of the alumina defined above are impregnated with an aqueous nitric solution of stannous chloride containing 20 cc of nitric acid and 1.9 g of stannous chloride in 250 cc of solution, at the rate of 1 g of alumina to 2.5 cc of solution. The impregnation is carried out at approximately 50° to 60° C in a partial vacuum. Thus an alumina is obtained on which solid tin is deposited, followed by calcination at 350° C for 4 hours and then at 600° C for two hours.

The solid obtained then is subjected to impregnation with nickel by the method described in connection with the preparation of the controls. Thus, catalyst A is impregnated by the static method, and catalyst B by the dynamic method.

Analysis shows that the catalysts contain, in weight percent:

Catalyst A: 0.36% nickel, 1% tin
Catalyst B: 0.40% nickel, 1% tin

The solids obtained are subjected to the same gas treatment as controls T1 and T2.

CATALYST TESTS 2 cc of the four catalysts T1, T2, A and B are charged to small reactors maintained at 550° C. Normal heptane, $nC_7$, is then introduced into the reactors with hydrogen under the following conditions:

| Duration | 7 hr |
|---|---|
| Pressure | 1 atm |
| Space velocity | 80 v/v/hr* |
| $\dfrac{H_2}{nC_7} =$ | 20 |

*v/v/hr designates the space velocity of the n-heptane in the gaseous phase, that is to say, the volume of gaseous n-heptane passing over a unit volume of catalyst per hour.

Before each test, the catalyst is treated with a pure, dry hydrogen stream at 520° C for 2 hours.

The reactor effluents are analyzed in the gaseous phase by chromatography, which reveals:

The $C_1$ to $C_4$ fraction representative of the cracking.
The "isomerics" fraction from isopentane ($iC_5$) to isoheptane ($iC_7$).
The percentage of aromatics (benzene - toluene).
The unconverted n-heptane.

A catalyst may be characterized at any time by the yield Y = percent of aromatics plus percent of isomerics, or by the selectivity S = (Y/C), where C is the conversion.

The results are set forth in Table 1.

Table 1

| Catalyst | Time hr. | % $C_1$ to $C_4$ | % Isomers | % Aromatics | Conversion % | Selectivity % |
|---|---|---|---|---|---|---|
| T1 | 1 | 43.5 | 4 | 23 | 71 | 38 |
|    | 3 | 33.5 | 5 | 17 | 55 | 40 |
|    | 5 | 30   | 4.5 | 12.5 | 47 | 36.2 |
|    | 7 | 30   | 5 | 9 | 44 | 31.8 |
| A  | 1 | 31.5 | 4.5 | 27 | 68 | 46.3 |
|    | 3 | 24   | 3.5 | 22 | 55 | 46.4 |
|    | 5 | 18.5 | 4 | 24 | 46 | 61 |
|    | 7 | 13.5 | 3 | 19 | 35 | 62.9 |
| T2 | 1 | 52.5 | 1.5 | 21 | 75 | 28.7 |
|    | 3 | 35   | 2 | 20 | 58 | 37.9 |

Table 1-continued

| Catalyst | Time hr. | % $C_1$ to $C_4$ | % Isomers | % Aromatics | Conversion % | Selectivity % |
| --- | --- | --- | --- | --- | --- | --- |
|  | 5 | 32 | 2 | 16 | 50 | 36 |
|  | 7 | 30 | 2 | 14.5 | 47 | 35.1 |
|  | 1 | 25 | 2 | 23 | 50 | 50 |
| B | 3 | 20 | 2.5 | 21.5 | 44 | 54.5 |
|  | 5 | 16 | 2.5 | 17 | 35.5 | 55 |
|  | 7 | 13 | 2.5 | 17 | 32.5 | 60 |

It is apparent from this table that the two catalysts A and B, which contain tin, are of greater interest for reforming than their counterparts T1 and T2. The main difference is the magnitude of the $C_1$ and $C_4$ (cracking) fraction, which is roughly halved when tin is deposited on the alumina-nickel solid. Moreover, the percentage of aromatics is higher for catalysts A and B than for T1 and T2. It is important to compare the selectivities, as defined above, of the different samples. It will be seen (from the last column of Table 1) that the catalysts in accordance with the invention are very much more selective than catalysts containing only nickel.

It should be noted that the catalysts T1, 1 T2, A and B were not calcined after the nickel had been deposited. Other tests run with a calcination of these solids at 400° C have shown that comparable results are obtained.

EXAMPLE 2

In this example, the catalysts T2 and B, after being reduced with hydrogen, are made to undergo a nickel impregnation identical in every respect to that already carried out ("double impregnation" method) as well as the same reducing treatment. The nickel contents are increased by about 50%, and the catalysts thus contain:

Catalyst T4 (T2 reimpregnated):0.63% nickel
Catalyst D (B reimpregnated):1% tin, 0.56% nickel Catalystic tests and analyses are then performed on these new solids analogous to the tests and analyses described in Example 1. The results are presented in Table 2.

Table 2

| Catalyst | Duration hr. | % $C_1$-$C_4$ | % $iC_5$-$iC_7$ | % Aromatics | Conversion % | Selectivity % |
| --- | --- | --- | --- | --- | --- | --- |
|  | 1 | 44 | 1.5 | 31 | 76.5 | 44.5 |
| T4 | 3 | 34.5 | 1.5 | 29.5 | 65.5 | 47.4 |
|  | 5 | 29.5 | 1 | 27 | 57.5 | 48.6 |
|  | 7 | 31 | 1.5 | 23.5 | 56 | 44.6 |
|  | 1 | 19 | 2 | 23 | 44 | 56.8 |
| D | 3 | 16 | 2.5 | 24 | 42.5 | 62.4 |
|  | 5 | 14 | 2.5 | 22 | 38.5 | 63.6 |
|  | 7 | 13 | 2.5 | 21 | 36.5 | 64.4 |

It is apparent from this table that:
1. Catlayst D, which contains tin, is more selective than catalyst T4, which only contains nickel.
2. The performance of these two catalysts is better than that of the corresponding catalysts T2 and B. Especially the selectively is higher.

EXAMPLE 3

This example is illustrative of the preparation of a catalyst in accordance with the invention from nickel in cationic form.

Catalysts T5 and E are prepared by static impregnation. The nickel is deposited in the same manner as in the case of catalyst B of Example 1. The nickel is deposited by means of an aqueous solution of nickel nitrate, $Ni(NO_3)_2.6H_2O$, with an initial nickel concentration of 0.7 grams/liter, (duration of impregnation, 16 hr.)

The solids obtained after the gas treatments contain:
Catalyst T5:0.36% nickel
Catalyst E:0.34% nickel, 1% tin The results of catalytic tests identical to those of Example 1 are presented in Table 3.

Table 3

| Catalyst | Duration hr. | % $C_1$-$C_4$ | % $iC_5$-$iC_7$ | % Aromatics | Conversion % | Selectivity % |
| --- | --- | --- | --- | --- | --- | --- |
|  | 1 | 46.5 | 2 | 26.5 | 75 | 38 |
| T5 | 3 | 38 | 2 | 27 | 67 | 43.3 |
|  | 5 | 33.5 | 2 | 23 | 58.5 | 42.7 |
|  | 7 | 32 | 2 | 20 | 54 | 40.7 |
|  | 1 | 22 | 2.5 | 23 | 47.5 | 53.7 |
| E | 3 | 20.5 | 3 | 25 | 48.5 | 57.8 |
|  | 5 | 19.5 | 2.5 | 23.5 | 45.5 | 57.1 |
|  | 7 | 16 | 2.5 | 22.5 | 41 | 61 |

It is seen from this table that catalyst E, which contains tin and nickel, is more selective than catalyst T5, which only contains nickel, and that its selectivity is on a par with that of the preceding catalysts A, B and D.

EXAMPLE 4

In this example, an alumina comparable to the one used in Example 1 is impregnated by the dynamic method over 16 hours by means of a solution of nickelous ammonium oxalate and diammonium oxalate in excess (salts precipitated with alcohol) analogous to the impregnating solution employed for catalysts T1 and T2 but without the addition of extra diammonium oxalate, the nickel concentration being initially 1.5 grams/liter. The impregnation is carried out at 80° C.

The rest of the procedure followed in the preparation is identical in every respect to that of catalysts T1 and T2. Thus a control catalyst T6 is obtained which contains:
0.99% nickel and
0.19% sulfur.

A second catalyst, F, containing tin is prepared. The tin is deposited in the same manner as in the case of catalysts A and B. Then, after calcination, the nickel is deposited by the procedure employed for catalyst T6. Catalyst F, after drying at 120° C and a gas treatment identical to that of T1 and T2, contains:
0.86% nickel,
1% tin, and
0.14% sulfur.

Catalyst tests identical to those run in Example 1 are then made. The results of these tests are presented in Table 4.

Table 4

| Catalyst | Duration hr. | % $C_1$-$C_4$ | % $iC_5$-$iC_7$ | % Aromatics | Conversion % | Selectivity % |
| --- | --- | --- | --- | --- | --- | --- |
|  | 1 | 41 | 3 | 29 | 73 | 44 |
| T6 | 3 | 33 | 2.5 | 31 | 66.5 | 50 |
|  | 5 | 28 | 2.5 | 29 | 59.5 | 53 |
|  | 7 | 25 | 3 | 26 | 54 | 54 |
|  | 1 | 23 | 3 | 30 | 56 | 59 |
| F | 3 | 18 | 3 | 33 | 54 | 67 |
|  | 5 | 14 | 3 | 31 | 48 | 71 |
|  | 7 | 12 | 3 | 29 | 44 | 72 |

From these results, it is apparent that catalyst F
has a very much lower cracking activity than control T6, and
gives more aromatics and has greater selectivity than control T6, which contains no tin.

EXAMPLE 5

This example illustrates the preparation and utilization of catalysts containing nickel as a first metal and a second metal from the group consisting of germanium, lead and tin.

A series of catalysts in accordance with the invention is prepared by depositing the second metal before the nickel, as described in the preceding examples. The second metals are deposited, for example, by means of the chlorides of these metals. The nickel is deposited by impregnation with a solution of nickel oxalate in an aqueous medium or of nickel hexammine chloride in an ammoniacal medium. The catalysts are subjected to a total dechlorination (by washing with ammonia, for example) so as to reduce the chlorine content to less than 0.01 wt. %.

The solids so obtained are dried at about 120° C, sulfurized by means of a stream of hydrogen and sulfurized hydrogen (20 mole percent of the mixture) at about 370° C, then desulfurized at about 500° C with pure hydrogen.

About 30 cc of the solid obtained is then introduced into a reactor. The charge is normal hexane and the reaction conditions are as follows:

$H_2/HC = 8$ (molar ratio of hydrogen to $nC_7$ in the charge)

Pressure: 10 bars v/v/hr: 2 (space velocity per hour, measured in the liquid phase)

Temperature: 540° to 560° C.

The same analyses are then performed on the effluent as in the preceding examples.

Tables 5, 6 and 7 show the results of some of the catalytic tests run with the formulas Ni-Ge (Table 5,) Ni-Sn (Table 6) and Ni-Pb (Table 7).

Table 5

| Catalyst Composition wt. % | Test Temp. ° C | Duration hr. | Conversion % | % Total Products in Effluent $C_1$-$C_4$ | $iC_5$-$iC_7$ | Aromatics |
|---|---|---|---|---|---|---|
| Ni 0.60 \ GE 0.50 | 540 | 1 | 83 | 41 | 24 | 18 |
|  |  | 3 | 77 | 41 | 20 | 16 |
|  |  | 6 | 70 | 39 | 18 | 13 |
| Ni 1.09 \ Ge 0.50 | 540 | 1 | 87 | 48 | 20 | 19 |
|  |  | 3 | 80 | 38 | 24 | 18 |
|  |  | 6 | 75 | 39 | 20 | 16 |
| Ni 1.31 \ Ge 0.5 | 540 | 1 | 92 | 45 | 24 | 23 |
|  |  | 3 | 88 | 48 | 19 | 21 |
|  |  | 6 | 87 | 47 | 22 | 18 |
| Ni 0.55 \ Ge 1 | 540 | 1 | 86 | 38 | 27 | 21 |
|  |  | 3 | 85 | 35 | 28 | 22 |
|  |  | 6 | 72 | 31 | 24 | 17 |
| Ni 0.85 \ Ge 1 | 540 | 1 | 82 | 40 | 22 | 20 |
|  |  | 3 | 81 | 37 | 24 | 20 |
|  |  | 6 | 74 | 36 | 23 | 15 |
| Ni 1.1 \ Ge 1 | 540 | 1 | 95 | 48 | 22 | 25 |
|  |  | 3 | 84 | 38 | 22 | 24 |
|  |  | 6 | 84 | 38 | 23 | 23 |
| Ni 1.25 \ Ge 1 | 540 | 1 | 85 | 43 | 22 | 20 |
|  |  | 3 | 81 | 41 | 20 | 20 |
|  |  | 6 | 80 | 39 | 19 | 22 |
| Ni 0.55 \ Ge 1 | 560 | 1 | 93 | 47 | 19 | 27 |
|  |  | 3 | 88 | 43 | 20 | 25 |
|  |  | 6 | 80 | 41 | 19 | 20 |
| Ni 0.94 \ Ge 1 | 560 | 1 | 93 | 45 | 21 | 27 |
|  |  | 3 | 91 | 44 | 20 | 27 |
|  |  | 6 | 85 | 41 | 20 | 24 |
| Ni 1.08 \ Ge 1.56 | 560 | 1 | 92 | 48 | 21 | 23 |
|  |  | 3 | 88 | 47 | 15 | 26 |
|  |  | 6 | 86 | 39 | 24 | 23 |
| Ni 1.21 \ Ge 1.56 | 560 | 1 | 98 | 46 | 13 | 39 |
|  |  | 3 | 92 | 41 | 20 | 31 |
|  |  | 6 | 93 | 40 | 23 | 30 |

Table 6

| Catalyst Composition wt. % | Test Temp. ° C | Duration hr. | Conversion % | Content of Effluent, % $C_1$ - $C_4$ | $iC_5$ - $iC_7$ | Aromatics |
|---|---|---|---|---|---|---|
| Ni 1.31 \ Sn 1 | 540 | 1 | 82 | 40 | 24 | 17 |
|  |  | 3 | 72 | 38 | 20 | 13 |
|  |  | 6 | 75 | 38 | 22 | 15 |
| Ni 1.73 \ Sn 1 | 540 | 1 | 86 | 43 | 24 | 19 |
|  |  | 3 | 84 | 48 | 20 | 16 |
|  |  | 6 | 76 | 43 | 20 | 13 |
| Ni 1.31 \ Sn 1 | 560 | 1 | 94 | 52 | 16 | 26 |
|  |  | 3 | 90 | 54 | 16 | 20 |
|  |  | 6 | 82 | 50 | 16 | 16 |

Table 7

| Catalyst Composition wt. % | Test Temp. ° C | Duration hr. | Conversion % | Content of Effluent, % $C_1$ - $C_4$ | $iC_5$ - $iC_7$ | Aromatics |
|---|---|---|---|---|---|---|
| Ni 1.6 \ Pb 1 | 540 | 1 | 82 | 38 | 20 | 24 |
|  |  | 3 | 71 | 36 | 20 | 15 |
|  |  | 6 | 52 | 32 | 10 | 10 |
| Ni 1.09 \ Pb 0.5 | 560 | 1 | 97 | 44.5 | 17.5 | 35 |
|  |  | 3 | 92 | 46 | 19 | 27 |
|  |  | 6 | 87 | 46.5 | 20.5 | 20 |

For comparison, the results obtained under the same test conditions with a catalyst containing only nickel are presented in Table 8.

Table 8

| Catalyst Composition wt. % | Test Temp. ° C | Duration hr. | Conversion % | Content of Effluent, % $C_1$ - $C_4$ | $iC_5$ - $iC_7$ | Aromatics |
|---|---|---|---|---|---|---|
| Ni 0.97 | 540 | 1 | 78 | 47 | 17 | 14 |
|  |  | 3 | 75 | 44 | 19 | 12 |
|  |  | 6 | 76 | 46 | 17.5 | 12.5 |
| Ni 1 | 560 | 1 | 98 | 58 | 15 | 25 |
|  |  | 3 | 97 | 57 | 16 | 24 |
|  |  | 6 | 82 | 55 | 14 | 15 |

When the catalysts in accordance with the invention (Tables 5, 6 and 7) are compared with the latter catalysts (Table 8), it will be seen that the former are better hydroreforming catalysts because:

They have a lower cracking activity. (Compare the percentages of $C_1$ to $C_4$).

The yield of products ($iC_5$ to $iC_7$) and aromatics in most cases is higher. Now these are the products of interest by reason of their high octane rating, which is the object of hydroreforming.

From the results obtained, it may further be concluded that the catalytic formulas based on nickel and germanium are somewhat superior to the formulas based on nickel and lead or tin. The latter are deactivated rather rapidly and must be regenerated (by any of the known procedures) more often than the nickel-germanium formulas.

EXAMPLE 6

This example illustrates tests of long duration conducted with nickel-germanium catalysts prepared by the methods described in the preceding examples.

Five tests were run with five different catalysts whose compositions are given in Table 9, together with the conditions and results of catalytic tests performed on normal heptane, as outlined earlier.

The pressure is 10 bars, the molar ratio of hydrogen to n-heptane is 8, and the space velocity is 2, as in the preceding examples.

Table 9

| Catalyst Composition wt. % | Test Temp. °C | Duration hr. | Conversion % | Content of Effluent, wt. % | | |
|---|---|---|---|---|---|---|
| | | | | $C_1 - C_4$ | $iC_5 - iC_7$ | Aromatics |
| Ni 1.09 } Ge 0.28 | 540 | 2 | 91 | 43 | 19 | 29 |
| | | 13 | 64 | 28 | 22 | 14 |
| | | 21 | 59 | 26 | 22 | 11 |
| | | 37 | 52 | 22 | 20 | 10 |
| Ni 1.15 } Ge 1 | 540 | 4 | 78 | 33 | 22 | 23 |
| | | 11 | 67 | 28 | 21 | 18 |
| | | 35 | 54 | 22 | 20 | 12 |
| | | 44 | 55 | 24 | 20 | 11 |
| Ni 1.09 } Ge 1 | 540 | 1 | 91 | 40 | 20 | 31 |
| | | 12 | 63 | 26 | 21 | 16 |
| | | 22 | 56 | 22 | 21 | 16 |
| | | 44 | 51 | 20 | 21 | 10 |
| Ni 1.48 } Ge 1 | 540 | 2 | 84 | 36 | 21 | 27 |
| | | 13 | 65 | 27 | 21 | 17 |
| | | 25 | 56 | 24 | 20 | 12 |
| | | 42 | 52 | 21 | 20 | 11 |
| Ni 1.08 } Ge 1.56 | 550 | 2 | 99 | 49 | 18 | 32 |
| | | 14 | 91 | 43 | 23 | 25 |
| | | 31 | 81 | 37 | 26 | 18 |
| | | 47 | 76 | 35 | 26 | 15 |

It is apparent from these results that the nickel-germanium catalysts in accordance with the invention are good reforming catalysts. The percentage of isomerized products ($iC_5$ to $iC_7$) varies little with time while cracking and aromatics production seem to decline steadily as catalyst activity drops off. This is an interesting result because the sum of the products ($iC_5$ to $iC_7$ plus aromatics) increases with time in relation to cracking.

We claim:

1. In a process for the preparation of a hydroreforming non-platinum-metal-group containing catalyst, which comprises a non-cracking refractory-mineral carrier having the following metals in a free or combined state on said carrier:
   a. from 0.05 to 5%, based on the total catalyst weight, of at least one first metal, and
   b. at least one second metal, said catalyst being adapted for use in the reduced state,
   the improvement in said process comprising:
   said first metal being selected from the group consisting of iron, cobalt and nickel; and said second metal being selected from the group consisting of tin, germanium and lead whose weight percentages, based on the total catalyst weight, are between 0.02 and 5%, 0.01 and 4%, and 0.01 and 10% respectively;
   said refractory carrier being impregnated by at least one impregnation solution containing cations and/or anions formed from at least one of said first metals and by the same or at least a second solution containing cations and/or anions formed from at least one of said second metals;
   each second metal being deposited on said carrier, dried if necessary, and calcined between 400 and 700° C, and
   said catalyst being dried after deposit of the first metals and any calcination of any of the first metals not exceeding 500° C.

2. A process according to claim 1, wherein said carrier has a specific surface area greater than 15 m2/g and a pore volume greater than 0.1 cc/g.

3. A process as defined in claim 1, wherein following the deposition of said metals the solid obtained is dried at a temperature between 100° and 130° C.

4. A process according to claim 1, wherein said first metal percentages range from 0.1 to 1.5%.

5. A process as defined in claim 1, wherein said catalyst has only one first and one second metal thereon.

6. A process according to claim 5, wherein said carrier is an alumina whose specific surface area is between 100 and 350 m2/g, and has a pore volume greater than 0.1 cc/g and which contains from 0.05 to 2 wt.% of nickel.

7. A process as defined in claim 6, wherein said second metal is tin.

8. A process as defined in claim 6, wherein said second metal is germanium.

9. a process as defined in claim 6, wherein said second metal is lead.

10. A hydroreforming catalyst prepared according to claim 1.

11. In a process for the hydroreforming of a charge of hydrocarbons, the improvement comprising contacting said hydrocarbon charge with hydrogen and a reduced non-platinum-group-metal-containing catalyst under known conditions of hydroreforming, wherein said catalyst was prepared according to claim 9.

12. A process as defined in claim 11, wherein said hydrocarbon charge comprises hydrocarbons having a boiling point comprised between 35° and 250° C.

13. The process according to claim 1, further comprising after drying said carrier with said first metal(s) thereon, successively subjecting it to a sulfurizing treatment with hydrogen sulfide and/or organic sulfides and/or low-molecular-weight mercaptans, at a temperature between 350° and 400° C and a desulfurization with pure and dry hydrogen at a temperature between 500° and 600° C, to give a sulfur content to said carrier of from 0.01 to 0.5% of sulfur based upon the total catalyst weight.

14. In a process for the hydroreforming of a charge of hydrocarbons, the improvement comprising contacting said hydrocarbon charge with hydrogen and a reduced non-platinum-group-metal-containing catalyst under known conditions of hydroreforming, wherein said catalyst is bimetallic and was prepared according to claim 13, said carrier is alumina, said first metal is nickel, and said second metal is tin.

15. In a process for the hydroreforming of a charge of hydrocarbons, the improvement comprising contacting said hydrocarbon charge with hydrogen and a reduced non-platinum-group-metal-containing catalyst under known conditions of hydroreforming, wherein said catalyst is bimetallic and was prepared according to claim 13, said carrier is alumina, said first metal is nickel, and said second metal is germanium.

16. In a process for the hydroreforming of a charge of hydrocarbons, the improvement comprising contacting said hydrocarbon charge with hydrogen and a reduced non-platinum-group-metal-containing catalyst under known conditions of hydroreforming, wherein said catalyst is bemetallic and was prepared according to claim 13, said carrier is alumina, said first metal is nickel, and said second metal is lead.

17. A process according to claim 13, wherein said carrier is an alumina whose specific surface area is comprised between 100 and 350 m2/g.

18. A process as defined in claim 13, wherein said sulfurizing and/or said desulfurizing treatments are thereafter followed with a treatment with a gaseous mixture of hydrogen and steam at a temperature between 300° and 550° C.

19. A process as defined in claim 13, wherein hydrogen sulfide and/or organic sulfides and/or low-molecular-weight mercaptans are diluted with hydrogen.

20. A process as defined in claim 13, wherein the sulfurizing treatment is effected with a mixture of hydrogen and hydrogen sulfide containing from 1 to 20% of the latter.

21. The process according to claim 1, wherein all first metals are calcined at below 500° C.

22. The process according to claim 21, further comprising after drying said carrier with said first metal(s) thereon, successively subjecting it to a sulfurizing treatment with hydrogen sulfide and/or organic sulfides and/or low-molecular-weight mercaptans, at a temperature between 350° and 400° C and a desulfurization with pure and dry hydrogen at a temperature between 500° and 600° C, to give a sulfur content to said carrier of from 0.01 to 0.5% of sulfur based upon the total catalyst weight.

23. A process according to claim 22, wherein said carrier is an alumina whose specific surface area is comprised between 100 and 350 m2/g.

24. A process as defined in claim 22, wherein said catalyst has only one first and one second metal thereon.

25. A process as defined in claim 22, wherein said sulfurizing and/or said desulfurizing treatments are thereafter followed with a treatment with a gaseous mixture of hydrogen and steam at a temperature between 300° and 550° C.

26. A process as defined in claim 25, wherein hydrogen sulfide and/or organic sulfides and/or low-molecular-weight mercaptans are diluted with hydrogen.

27. A process as defined in claim 26, wherein said steam mixed with the hydrogen utilized immediately after the sulfurizing step has a partial pressure between 10 and 40 mm Hg.

28. A process as defined in claim 27, wherein said steam mixed with the hydrogen utilized immediately after the desulfurizing step has a partial pressure between 10 and 40 mm Hg.

29. A process as defined in claim 28, wherein the sulfurizing treatment is effected with a mixture of hydrogen and hydrogen sulfide containing from 1 to 20% of the latter.

30. In a process for the hydroreforming of a charge of hydrocarbons, the improvement comprising contacting said hydrocarbon charge with hydrogen and a reduced non-platinum-group-metal-containing catalyst under known conditions of hydroreforming, wherein said catalyst was prepared according to claim 22.

31. A process as defined in claim 30, wherein said hydrocarbon charge comprises hydrocarbons having a boiling point comprised between 35° and 250° C.

32. The process according to claim 22, wherein all second metals are calcined at between 500° and 600° C.

33. A process as defined in claim 32, wherein folllowing the deposition of said metals the solid obtained is dried at a temperature between 100° and 130° C.

34. A process according to claim 33 wherein said first metal percentages range from 0.1 to 1.5%.

35. The process according to claim 21, wherein all second metals are calcined at between 500° and 600° C.

36. The process as defined in claim 35, wherein said catalyst has only one first and one second metal thereon.

37. A process according to claim 36, wherein said carrier is an alumina whose specific surface area is between 100 and 350 m2/g, and has a pore volume greater than 0.1 cc/g, and which contains from 0.05 to 2 wt.% of nickel.

38. A process as defined in claim 37, wherein said second metal is tin.

39. A process as defined in claim 37, wherein said second metal is germanium.

40. A process as defined in claim 37, wherein said second metal is lead.

41. A hydroreforming catalyst prepared according to claim 35.

42. A bimetallic catalyst as claimed in claim 41, wherein said carrier is alumina, said first metal is nickel, and said second metal is tin.

43. A bimetallic catalyst as claimed in claim 41, wherein said carrier is alumina, said first metal is nickel, and said second metal is germanium.

44. A bimetallic catalyst as claimed in claim 41, wherein said carrier is alumina, said first metal is nickel, and said second metal is lead.

45. The process according to claim 21, wherein following the calcination of said second metals the catalyst is reduced.

46. The process according to claim 45, wherein the reduction of the catalyst is with hydrogen at a temperature of between 500° and 600° C.

47. A process according to claim 21, wherein said carrier has a specific surface area greater than 15 m2/g and a pore volume greater than 0.1 cc/g.

* * * * *